United States Patent
Abdel-Fattah et al.

(10) Patent No.: US 9,223,558 B2
(45) Date of Patent: *Dec. 29, 2015

(54) SOFTWARE INSTALLATION AND CONFIGURATION

(71) Applicant: International Business Machines Corporation, Armonk, NY (US)

(72) Inventors: Ahmed I. Abdel-Fattah, Cairo (EG); Mahmoud Eissa, Cairo (EG); Hisham E. El-Shishiny, Giza (EG); Mohamed A. Maher Khalil, Cairo (EG); Ossama Shokry, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,446

(22) Filed: Jun. 2, 2014

(65) Prior Publication Data

US 2015/0347110 A1 Dec. 3, 2015

(51) Int. Cl.
  *G06F 9/44* (2006.01)
  *G06F 9/445* (2006.01)
  *G06F 17/30* (2006.01)

(52) U.S. Cl.
  CPC ............ *G06F 8/61* (2013.01); *G06F 17/30864* (2013.01)

(58) Field of Classification Search
  CPC ....... G06F 17/30289; G06F 8/65; G06F 8/71; G06F 8/61; G06F 11/1433; G06F 8/60; G06F 9/45512; G06F 8/70
  See application file for complete search history.

(56) References Cited

U.S. PATENT DOCUMENTS

| | | | |
|---|---|---|---|
| 6,266,811 B1 | 7/2001 | Nabahi | |
| 7,036,079 B2 | 4/2006 | McGlinchey et al. | |
| 7,228,542 B2 * | 6/2007 | Bryant et al. | 717/177 |
| 7,366,706 B2 | 4/2008 | Chang et al. | |
| 7,490,073 B1 | 2/2009 | Qureshi et al. | |
| 7,890,309 B2 * | 2/2011 | Bhaskaran et al. | 703/6 |
| 8,170,975 B1 | 5/2012 | Qureshi et al. | |

(Continued)

OTHER PUBLICATIONS

V. N. Venkatakrishnan et al.; An Approach for Secure Software Installation; 2002 usenix; 15 pages; <http://static.usenix.org/legacy/events/lisa02/tech/full_papers/venkatakrishnan/venkatakrishnan_html/>.*

(Continued)

*Primary Examiner* — Thuy Dao
*Assistant Examiner* — Cuong V Luu
(74) *Attorney, Agent, or Firm* — Patricia B. Feighan; Robert E. Straight, II

(57) ABSTRACT

A method to manage an initial software installation and configuration script is provided. The method may include saving, by a plurality of collaboration tools, a new customization associated with the initial software installation and configuration script in an installation and configuration knowledgebase. The method may also include saving, by the plurality of collaboration tools, a new solution associated with the initial software installation and configuration script in the installation and configuration knowledgebase. The method may further include querying, by a search engine or a similarity engine, the installation and configuration knowledgebase for the new customization or the new solution based on a comparison between a criteria provided by an administrator and an index of vocabularies stored in the configuration knowledgebase related to the initial installation and configuration script. Additionally, the method may include returning a search result based on the querying the installation and configuration knowledgebase.

11 Claims, 8 Drawing Sheets

(56) References Cited

U.S. PATENT DOCUMENTS

| | | | |
|---|---|---|---|
| 8,346,897 B2 | 1/2013 | Jaroker | |
| 8,527,979 B2 | 9/2013 | Wookey | |
| 2005/0080640 A1* | 4/2005 | Bhaskaran et al. | 705/1 |
| 2006/0112383 A1* | 5/2006 | Chang et al. | 717/168 |
| 2007/0294364 A1 | 12/2007 | Mohindra et al. | |
| 2009/0037875 A1* | 2/2009 | Jones et al. | 717/109 |
| 2009/0106753 A1* | 4/2009 | Wang et al. | 717/176 |
| 2009/0217163 A1* | 8/2009 | Jaroker | 715/700 |
| 2010/0131939 A1 | 5/2010 | Hieb et al. | |
| 2010/0186009 A1* | 7/2010 | Sen et al. | 717/178 |
| 2010/0299653 A1* | 11/2010 | Iyer et al. | 717/121 |
| 2011/0078211 A1 | 3/2011 | Gass et al. | |
| 2011/0283138 A1* | 11/2011 | Sangubhatla et al. | 714/15 |
| 2011/0296377 A1* | 12/2011 | Morozov et al. | 717/113 |
| 2013/0185592 A1 | 7/2013 | Fleming et al. | |
| 2013/0268917 A1* | 10/2013 | Chandrasekharan | 717/126 |

OTHER PUBLICATIONS

Tobias Oetiker; SEPP Software Installation and Sharing System; 1998 usenix; 19 pages; <https://www.usenix.org/legacy/event/lisa98/full_papers/oetiker2/oetiker2_html/oetiker2.html>.*

Alan Dearle; Software Deployment, Past, Present and Future; 2007 ACM; pp. 269-284; <http://dl.acm.org/citation.cfm?id=1254724>.*

K. Rabbertz et al.; CMS Software Installation; 2005 cds; pp. 535-538; <http://cds.cern.ch/record/865645/files/p535.pdf>.*

Michael Huhns et al.; Approaches for Service Deployment; 2005 IEEE; pp. 70-80; <http://ieeexplore.ieee.org/stamp/stamp.jsp?tp=&arnumber=1405978>.*

Noriaki Ando et al.; Software Deployment Infrastructure for Component Based RT-Systems; 2011 openrtm.org; pp. 350-359; <http://openrtm.org/openrtm/sites/default/files/4564/JRM_Vol23_No3_%20Jun_2011_pp.350-359.pdf>.*

Disclosed Anonymously, "Sharing Configuration Settings Across Integrated Industry Stacks Deployment Solution," ip.com, IPCOM000202967D, Jan. 12, 2011, pp. 1-4.

Disclosed Anonymously, "Unix Installer with Changeable Configuration Files Inside Installer," ip.com, IPCOM000205287D, Mar. 24, 2011, pp. 1-5.

IBM: List of IBM Patents or Patent Applications Treated as Related (Appendix P), dated Feb. 2, 2015.

Pending U.S. Appl. No. 14/608,225, filed Jan. 29, 2015, entitled "Software Installation and Configuration".

* cited by examiner

SOFTWARE INSTALLATION AND CONFIGURATION

FIELD OF THE INVENTION

The present invention relates generally to the field of computing, and more particularly to software installation and configuration.

BACKGROUND

Many software products typically provide sample initial scripts for installation and configuration under select environments. However, the provided scripts may not cover all environments. Additionally, some specific steps for unusual conditions, such as specific environment parameters or additional configurations related to an environment may not be included in the scripts. As such, a skilled administrator may need to customize the provided script to fit a specific new condition or environment.

SUMMARY

According to one embodiment, a method to manage an initial software installation and configuration script is provided. The method may include saving, by a plurality of collaboration tools, a new customization associated with the initial software installation and configuration script in an installation and configuration knowledgebase. The method may also include saving, by the plurality of collaboration tools, a new solution associated with the initial software installation and configuration script in the installation and configuration knowledgebase. The method may further include querying, by a search engine or a similarity engine, the installation and configuration knowledgebase for the new customization or the new solution based on a comparison between a criteria provided by an administrator and an index of vocabularies related to the initial installation and configuration script, wherein the index of vocabularies correlate to a plurality of situation descriptions stored in the configuration knowledgebase. Additionally, the method may include returning, by the search engine or the similarity engine, a search result based on the querying the installation and configuration knowledgebase, wherein the search result identifies a customization or a solution that exactly matches or is a nearest similar match between the criteria provided by the administrator and the index of vocabularies.

According to another embodiment, a computer system to manage an initial software installation and configuration script is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include saving, by a plurality of collaboration tools, a new customization associated with the initial software installation and configuration script in an installation and configuration knowledgebase. The method may also include saving, by the plurality of collaboration tools, a new solution associated with the initial software installation and configuration knowledgebase. The method may further include querying, by a search engine or a similarity engine, the installation and configuration knowledgebase for the new customization or the new solution based on a comparison between a criteria provided by an administrator and an index of vocabularies related to the initial installation and configuration script, wherein the index of vocabularies correlate to a plurality of situation descriptions stored in the configuration knowledgebase. Additionally, the method may include returning, by the search engine or the similarity engine, a search result based on the querying the installation and configuration knowledgebase, wherein the search result identifies a customization or a solution that exactly matches or is a nearest similar match between the criteria provided by the administrator and the index of vocabularies.

According to yet another embodiment, a computer program product to manage an initial software installation and configuration script is provided. The computer program product may include one or more computer-readable tangible storage medium and program instructions stored on at least one of the one or more tangible storage medium, the program instructions executable by a processor. The computer program product may include program instructions to save, by a plurality of collaboration tools, a new customization associated with the initial software installation and configuration script in an installation and configuration knowledgebase. The computer program product may also include program instructions to save, by the plurality of collaboration tools, a new solution associated with the initial software installation and configuration script in the installation and configuration knowledgebase. The computer program product may further include program instructions to query, by a search engine or a similarity engine, the installation and configuration knowledgebase for the new customization or the new solution based on a comparison between a criteria provided by an administrator and an index of vocabularies related to the initial installation and configuration script, wherein the index of vocabularies correlate to a plurality of situation descriptions stored in the configuration knowledgebase. Additionally, the computer program product may include program instructions to return, by the search engine or the similarity engine, a search result based on the querying the installation and configuration knowledgebase, wherein the search result identifies a customization or a solution that exactly matches or is a nearest similar match between the criteria provided by the administrator and the index of vocabularies

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
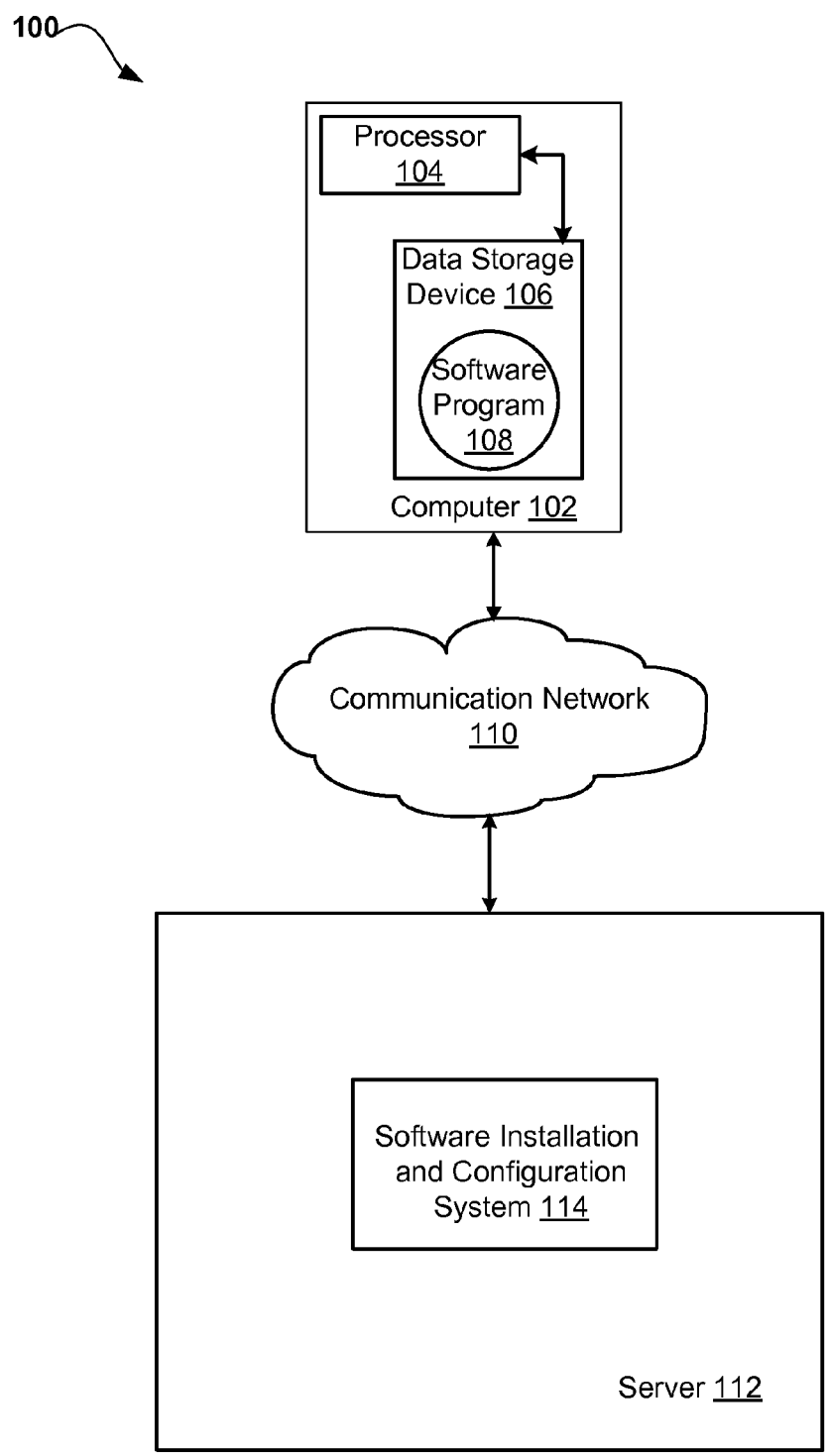
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to software installation and configuration. The following described exemplary embodiments provide a system, method and program product to, among other things, continuously accumulate and remember problematic situations during software installation and configuration, together with the related initial script changes or customizations in addition to any information that was performed or communicated by skilled administrators or developers to fix or support others to fix similar situations.

As previously described, many software products typically provide sample initial scripts for installation and configuration under select environments. However, the provided scripts may not cover all environments. Additionally, some specific steps for unusual conditions, such as specific environment parameters or additional configurations related to an environment may not be included in the scripts. As such, a skilled administrator may need to customize the provided script to fit a specific new condition or environment. However, the effort spent by the skilled administrator to modify the initial script to fit a new environment, or new situation within this environment may be lost and may not be propagated to other users (i.e., administrators), who may have less skills, and may want to install and configure the same product easily to similar environments and conditions. As such, it may be advantageous, among other things, to provide the correct customized script, or guidance on how to correctly customize a script to less skilled administrators in order to save the administrators' efforts when the administrators are faced with previously addressed similar problematic situations.

According to at least one implementation, a collaborative learning environment may be provided between system administrators who may be skilled and not skilled. As such, the present embodiment may capture and save the customizations and error fixing, performed by skilled administrators, to a provided software product initial installation and configuration scripts, for specific environments and situations, in order to facilitate the identification and replication of the fixed scripts, when needed by less skilled administrators. Additionally, the present embodiment may communicate with administrators by either providing them with fixed scripts for their problems, or supply them with the nearest experience and knowledge, captured by the system, that can help them with fixing the scripts to fit the new problems they are facing.

Furthermore, the system may then capture the new knowledge, experience and installation script from the skilled administrator, for possible reuse by other administrators facing similar problems in the future. Therefore, the present embodiment may provide an environment for novice administrators to communicate and collaborate with more skilled administrators, as well as the software product developers, regarding installation and configuration problems, and capture and associate this communication with the situations stored in a knowledgebase for possible future guidance of others with respect to the solutions of these situations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to, among other things, continuously accumulate and remember problematic situations during software installation and configuration, together with the related initial script changes or customizations in addition to any information that was performed or communicated by skilled administrators or developers to fix or support others to fix similar situations.

As previously described, the present embodiment may capture a skilled administrator's changes and customizations to an initial software product installation and configuration script, together with knowledge related to the reasons for such a customization and/or modification, through a user (i.e., administrator) interface. According to at least one implementation, the new customized and/or modified scripts may be stored in a knowledgebase (i.e., an installation and configuration knowledgebase). Furthermore, the new customized and/or modified scripts may be associated, through meta data, with new environment parameters and/or errors encountered that may have been previously fixed, together with a description of why and how the customized script was developed. As such, the customized script may be searched, identified, reused, or provide guidance on how to customize a script in similar environments and conditions. Additionally, an environment may be provided in which novice administrators may communicate and collaborate with more skilled administrators, as well as the software product developers, around installation and configuration problems, and capture and associate this communication with the situations stored in the knowledgebase for possible future guidance of others, around the solutions of these situations.

As such, the present embodiment may become more efficient over time, as it may continuously accumulate and remember problematic situations during installation and configuration, together with the related initial script changes or customizations and knowledge that were needed to fix these situations. According to at least one implementation, the present embodiment may be achieved by communicating with the administrators involved in these situations and exchanging experiences and knowledge, about new situations, with them, as well as continuously capturing and storing the communications between novice and skilled administrators, as well as the software product developers, around these situations.

Referring now to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 112 running a software installation and configuration system 114 and a communication network 110. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the software installation and configuration system 114 running on server computer 112 via the communications network 110. The communications network 110 may include connections, such as wire, wireless communication links, or fiber optic cables. As will be discussed with reference to FIG. 7, server computer 112 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a network and capable of accessing a server 112.

Figure 2:
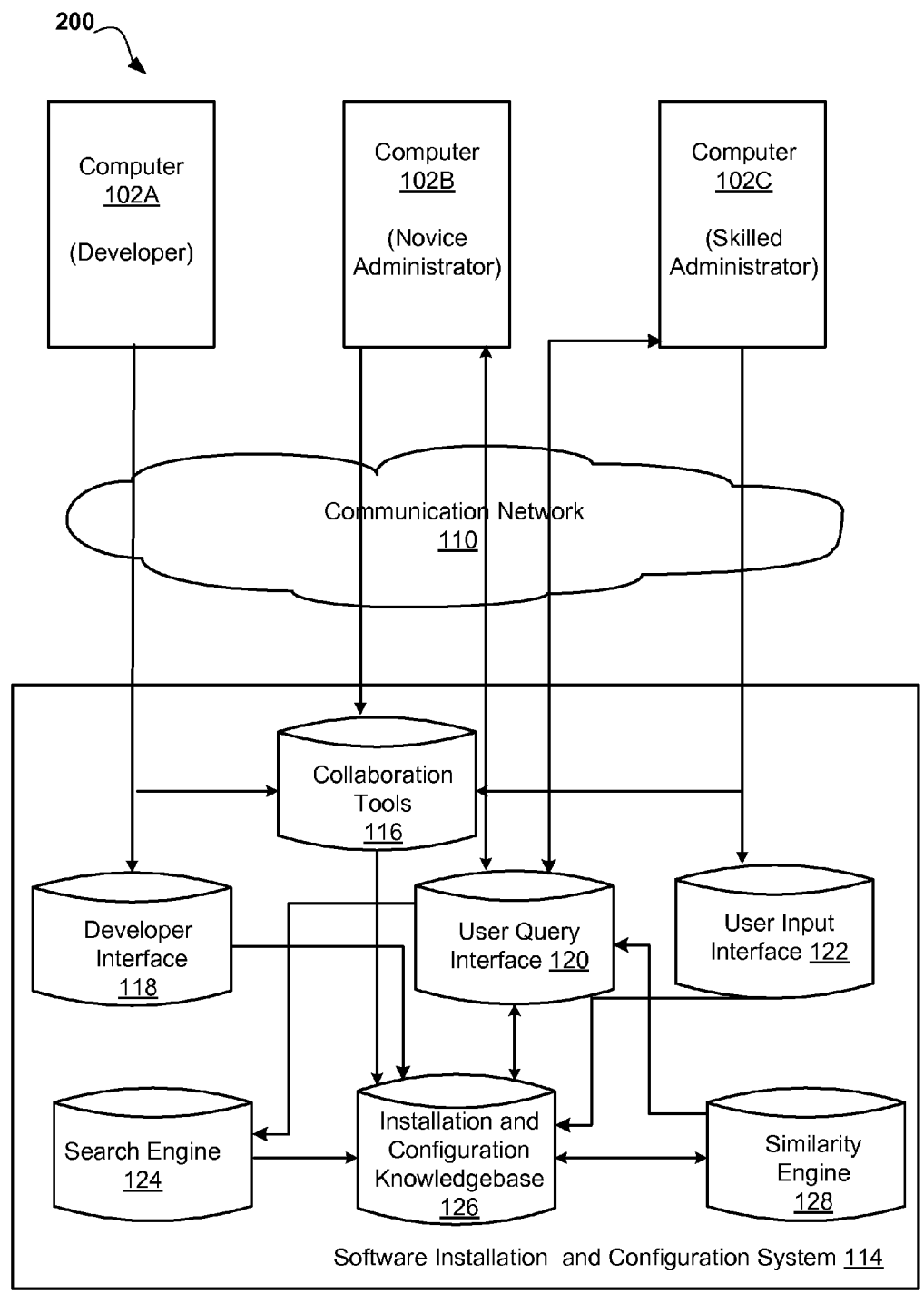
FIG. 2 illustrates a networked computer environment including the components of the installation and configuration system according to one embodiment.

Referring now to FIG. 2, a networked computer environment 200 illustrating the components of the software installation and configuration system 114 in accordance with one embodiment is depicted. The software installation and configuration system 114 may include components, such as collaboration Tools 116; a developer interface 118; a user query interface 120; a user input interface 122; a search engine 124; an installation and configuration knowledgebase 126; and a similarity engine 128. The software installation and configuration system 114 may be utilized by product developers using a computer, such as computer 102A. The product developers may be the developers of software products that may be installed and configured by administrators. The software installation and configuration system 114 may be also be utilized by skilled administrators using a computer, such as computer 102C or novice administrators using a computer, such as computer 102B.

According to one implementation of the present embodiment, the software installation and configuration system 114, running on server computer 112 may interact with components, such as the installation and configuration knowledgebase 126. The installation and configuration knowledgebase 126 may contain both structured and unstructured information about software products, the environments related to the software products, and the installation and configuration of the software products. Additionally, the installation and configuration knowledgebase 126 may also contain a log for any related communications between administrators (skilled and not skilled) as well as developers. An example of the information contained in the installation and configuration knowledgebase may be as follows:

> Product information
> Environment information
> Initial installation and configuration script
> New situation description (including error messages encountered, specific related features, and how it was fixed)
> Installation and configuration script new instance
> Administrator/developer contact and communication log
> ...
> New situation description (including error messages encountered and specific related features, and how it was fixed)
> Installation and configuration script new instance
> Administrator/developer contact and communication log Furthermore, according to one implementation of the present embodiment, the search engine 124 may search the installation and configuration knowledgebase 126 based on provided criteria (e.g., submitted queries) from administrators. As such, the new situation description free text fields of the installation and configuration knowledgebase 126, including the related previous communications between administrators as well as developers, may be indexed by features and/or error messages, to facilitate and expedite the search by the search engine 124, for the previous problematic situations that were solved by a new instance of the installation or configuration script. The indexing may be for the features of a situation that encodes the circumstances under which it is appropriate to be used. This may be based on constructing indexing vocabularies related to installation and configuration.

Then, based on an administration query (i.e., provided criteria), if no direct match in the installation and configuration knowledgebase 126 exists, the similarity engine 128 may identify the closest situations in the installation and configuration knowledgebase 126. According to one implementation, the similarity engine 128 may identify the closest situations in the installation and configuration knowledgebase 126 by matching the indices derived from the administrator query against those used to label the stored situations' descriptions (and the related administrators/developer communication log) in the installation and configuration knowledgebase 126 (using same indexing vocabulary), and by applying a similarity algorithm such as the nearest neighbor matching algorithm.

Additionally, according to one implementation, the collaboration tools 116 may provide a means of communication between the experienced administrators and product developers. Furthermore, the collaboration tools 116 may capture or log the communications between the experienced administrators and product developers with respect to the problems. Also, the collaboration tools 116 may provide the installation and configuration knowledgebase 126 with all the communication logs correlated with the product and environment information in addition to all the related scripts.

Furthermore, the developer input interface 118 may allow the product developer to enter the product information, the environment information and the initial installation/configuration script, as well as the developer's contacts into the installation and configuration knowledgebase 126. Also, the user query interface 120 may allow the administrators to search for similar new installation or configuration situations through queries and identify installation or configuration scripts regarding new instances for these situations, if they exist in the installation and configuration knowledgebase 126. As such, the administrators may receive knowledge and guidance from the system, about the closest similar situations to their problems (in case no direct match exists in the installation and configuration knowledgebase 126), that may help them solve their problems, and to get in contact with the administrators that provided the new script instances for the closest similar situations, as well as the software product developer, through system initiated emails and instant messaging.

Additionally, the user input interface 122, may allow an administrator to enter into the installation and configuration knowledgebase 126, the new situation features/error messages and the associated knowledge, as well as a new instance of the script that the administrator may have modified (in case search for a similar situation in the installation and configuration knowledgebase 126 was not successful and administrator was able to fix the problem), and to enter the administrator's contacts (emails and instant messaging). The method associated with the software installation and configuration system 114 is explained in further detail below with respect to FIG. 3.

Figure 3A:
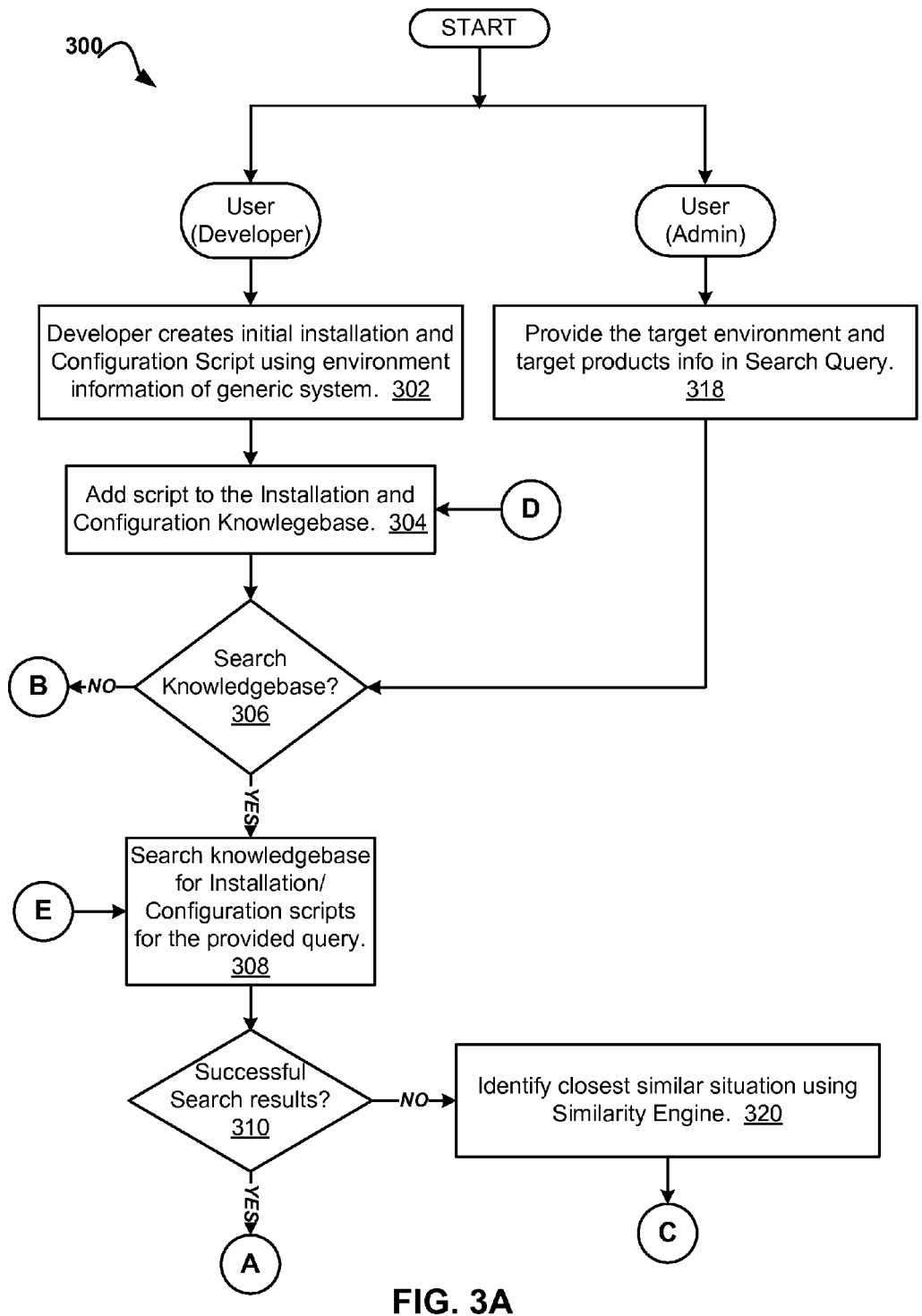
FIGS. 3A-3B is an operational flowchart illustrating the steps carried out by a program to accumulate and remember problematic situations during software installation and configuration, together with related initial script changes or customizations in addition to any information that was performed or communicated by skilled administrators or developers to fix or support others to fix similar situations.
Figure 3B:
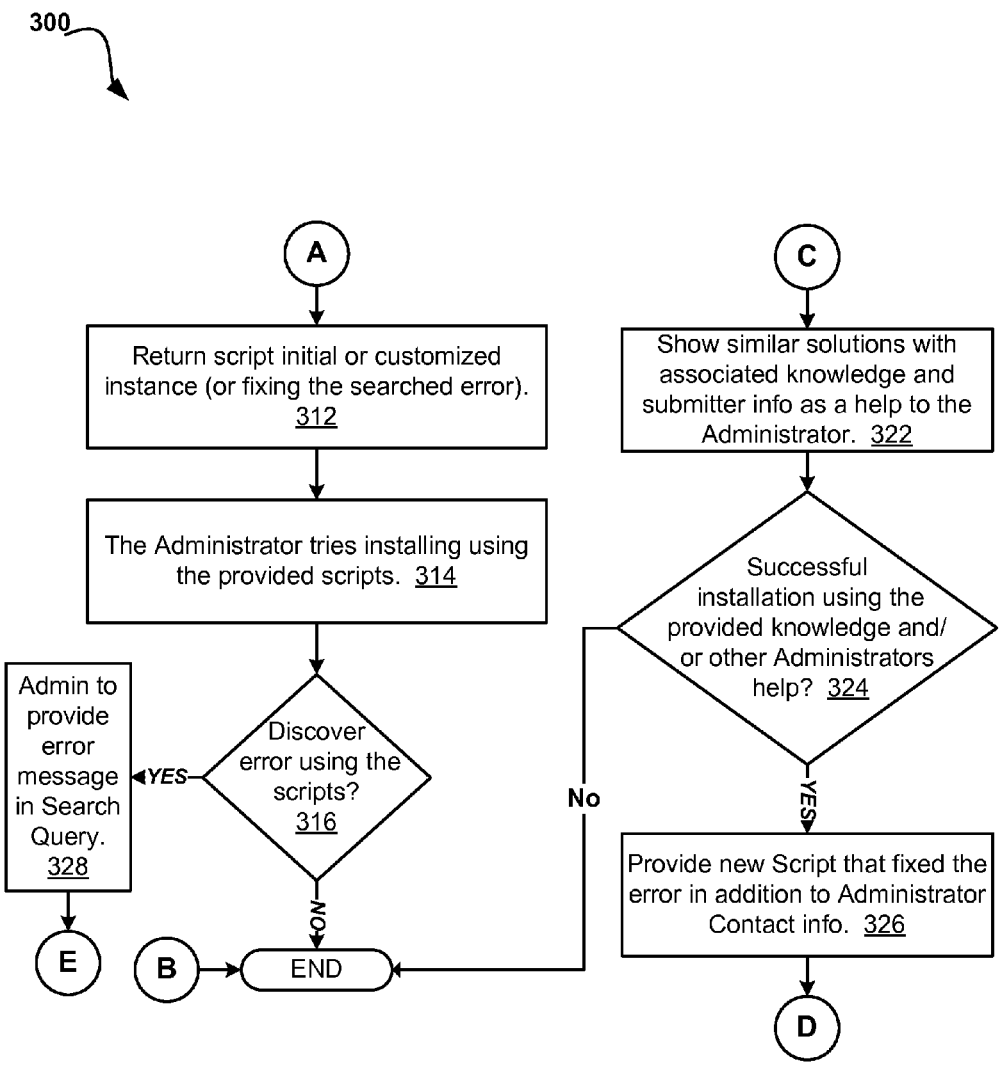

FIGS. 3A-3B, an operational flowchart 300 illustrating the steps carried out by a program to accumulate and remember problematic situations during software installation and configuration, together with related initial script changes or customizations in addition to any information that was performed or communicated by skilled administrators or developers to fix or support others to fix similar situations in accordance with one embodiment is depicted. At 302, the developer creates an initial installation and configuration script using environment information of a generic system (i.e., a sample environment). For example, an administrator may need to install and configure a software product. Therefore, a developer using a computer, such as computer 102A (FIG. 2) may create (for a software product) the initial installation and configuration script with generic environment information to assist with the initial installation and configuration of the software product.

Next at 304, the script is added to the installation and configuration knowledgebase. For example, the developer may enter the initial installation and configuration script with the environment information (via the developer interface 118 (FIG. 2)) in the installation and configuration knowledgebase 126 (FIG. 2), together with their contacts.

Similarly, at 318, an administrator may provide the target environment and target products information into a search query. Therefore, according to one implementation, an administrator starting an installation and configuration for a specific product, using the software installation and configuration system 114 (FIG. 2), for a specific environment, may search (via the search engine 124 (FIG. 2)) the installation and configuration knowledgebase 126 (FIG. 2). The search may be performed using queries, submitted through the installation and configuration system user query interface 120 (FIG. 2) that may contain the target product information and the target environment information.

Then at 306 it is determined whether the installation and configuration knowledgebase should be searched. According to one implementation, a search of the installation and configuration knowledgebase 126 (FIG. 2) may be performed when an administrator initiates a search query as previously explained with respect to step 318. However, a search of the installation and configuration knowledgebase 126 (FIG. 2) may not be performed when a developer enters the initial installation and configuration script with the environment information (via the developer interface 118 (FIG. 2)) in the installation and configuration knowledgebase 126 (FIG. 2), together with their contacts as previously explained with respect to step 302.

Therefore, if at 306 it is determined that the installation and configuration knowledgebase should not be searched (e.g., a developer entered the initial installation and configuration script with the environment information) then the method may end. However, if at 306 it is determined that the installation and configuration knowledgebase should be searched (e.g., an administrator initiated a search query) then at 308 the installation and configuration knowledgebase 126 (FIG. 2) may be searched for installation and/or configuration scripts for the provided query.

Next at 310, it is determined whether the search results were successful. According to one implementation, a successful search of the installation and configuration knowledgebase 126 (FIG. 2) would result in installation and/or configuration scripts that match the provided query.

If at 310, it is determined that the search was successful, then at 312 the initial script, the customized instance of the script, or the script that fixes the searched error may be returned to the administrator. For example, according to one implementation, if the search is successful, the software installation and configuration system 114 (FIG. 2) through its user query interface 120 (FIG. 2) may return the query with the initial script that was provided by the developer or a customized script instance created from it, provided by another administrator.

Then at 314 the administrator tries installing the software using the provided scripts. Next at 316, it is determined whether an error has been discovered using the provided scripts. If at 316, it is determined that an error has not been discovered by the administrator using the provided scripts, then the method may end. However, if at 316, it is determined that an error has been discovered by the administrator using the provided scripts, then at 328, the administrator may provide the error message in a search query. Next, the method may continue to step 308, as previously described, to search the installation and configuration knowledgebase 126 (FIG. 2) for installation and/or configuration scripts for the provided query. For example, during installation and configuration of a software product, if an error with an error message occurs while using the provided script by the software installation and configuration system 114 (FIG. 2), the software installation and configuration system 114 (FIG. 2) may respond to a search query (via the user query interface 120 (FIG. 2)), from the administrator. If a similar situation with the same error message was identified in the installation and configuration knowledgebase 126 (FIG. 2), then the search query response may contain the error encountered as well as an updated instance of the installation and configuration script that fixes this error.

If at 310, it is determined that the search was not successful, then at 320 the closest similar situation may be identified using the similarity engine 128 (FIG. 2). According to one implementation, if a similar situation was not found in the installation and configuration knowledgebase 126 (FIG. 2), the software installation and configuration system 114 (FIG. 2) may request from the administrator to enter, through the installation and configuration system user input interface 122 (FIG. 2), the new situation description (including error messages encountered and specific features). Then the software installation and configuration system 114 (FIG. 2), through its similarity engine 128 (FIG. 2), may identify the closest similar situations in the installation and configuration knowledgebase 126 (if any).

Next at 322, similar solutions with associated knowledge and submitter information may be shown as a help to the administrator. According to one implementation, the software installation and configuration system 114 (FIG. 2) may communicate the similar solutions with associated knowledge and submitter information to the administrator after warning the administrator that there is no direct solution to the administrator's situation in the installation and configuration knowledgebase 126 (FIG. 2). Additionally, the software installation and configuration system 114 (FIG. 2) may provide all knowledge associated with the similar situations that may provide guidance to solve the new situation (including previous communications log between administrators, as well as developers).

Then at 324, it is determined whether the installation was successful using the provided knowledge and/or help from other administrators. If at 324, it is determined that the installation was not successful based on the provided knowledge and/or help from other administrators, then the method may end. However, if at 324, it is determined that the installation was successful, then at 326, the new script that fixed the error in addition to administrator contact information is provided. As such, according to one implementation, the software installation and configuration system 114 (FIG. 2), through the collaboration tools 116 (FIG. 2), may link the administrator with the skilled administrators who provided the solutions for the closest similar situations as well as the software product developers (through system initiated email and instant messaging), for possible additional guidance, and will log the communications and associate them with the situation in the installation and configuration knowledgebase 126 (FIG. 2).

Next, the method may continue back to step 304 (previously explained) to add the script to the installation and configuration knowledgebase 126 (FIG. 2). As such, after examining the knowledge provided by the software installation and configuration system 114 (FIG. 2) closest similar situations, the administrator may enter in the installation and configuration knowledgebase 126 (FIG. 2), the script new instance that fits the new situation (in case the administrator succeeds in dealing with the new situation) together with the error message encountered and the knowledge gained when dealing with this new situation. The administrator may also enter his contacts (email and instant messaging).

Therefore, in case another non-skilled administrator encounters the same error message (as previously described), in a similar environment when installing and configuring the software product, the non-skilled administrator may search the installation and configuration knowledgebase 126 (FIG. 2) and may receive a script instance to run directly on this environment.

According to at least one implementation, the present embodiment may continuously accumulate and remember problematic situations during installation and/or configuration together with the current script changes and/or customizations that were needed to fix these situations. Additionally, the present embodiment may accumulate and remember the knowledge gained and associated with the current script changes and/or customizations and may make the current script changes and/or customizations available for new administrators who may run into the same problems in the future. This may be achieved by communicating with the administrators involved in these situations and exchanging experiences and knowledge, about new situations, with them, in addition to linking administrators who faced similar situations together, as well as with the software product developer, for possible additional guidance. As such, the present embodiment may become more efficient over time.

It may be appreciated that FIGS. 3A-3B provide only an illustration of one implementation and does not imply any limitations with regard to how different embodiments may be implemented. Many modifications to the depicted environments may be made based on design and implementation requirements. Implementations of the present embodiment may capture the customization and changes, performed by skilled administrators, to an initial software product installation and configuration script together with knowledge gained and associated with it.

Additionally, the present embodiment may permit less skilled administrators to save effort when faced with problematic situations related to installing and configuring software. Furthermore, the present embodiment may become more efficient over time, as the present embodiment may continuously accumulate skilled administrators' experiences, through exchanging of knowledge gained about specific situations with them. Also, the present embodiment may provide an environment for collaborative learning between novice and skilled administrators, as well as the software product developer, related to installation and configurations new situations.

Figure 4:
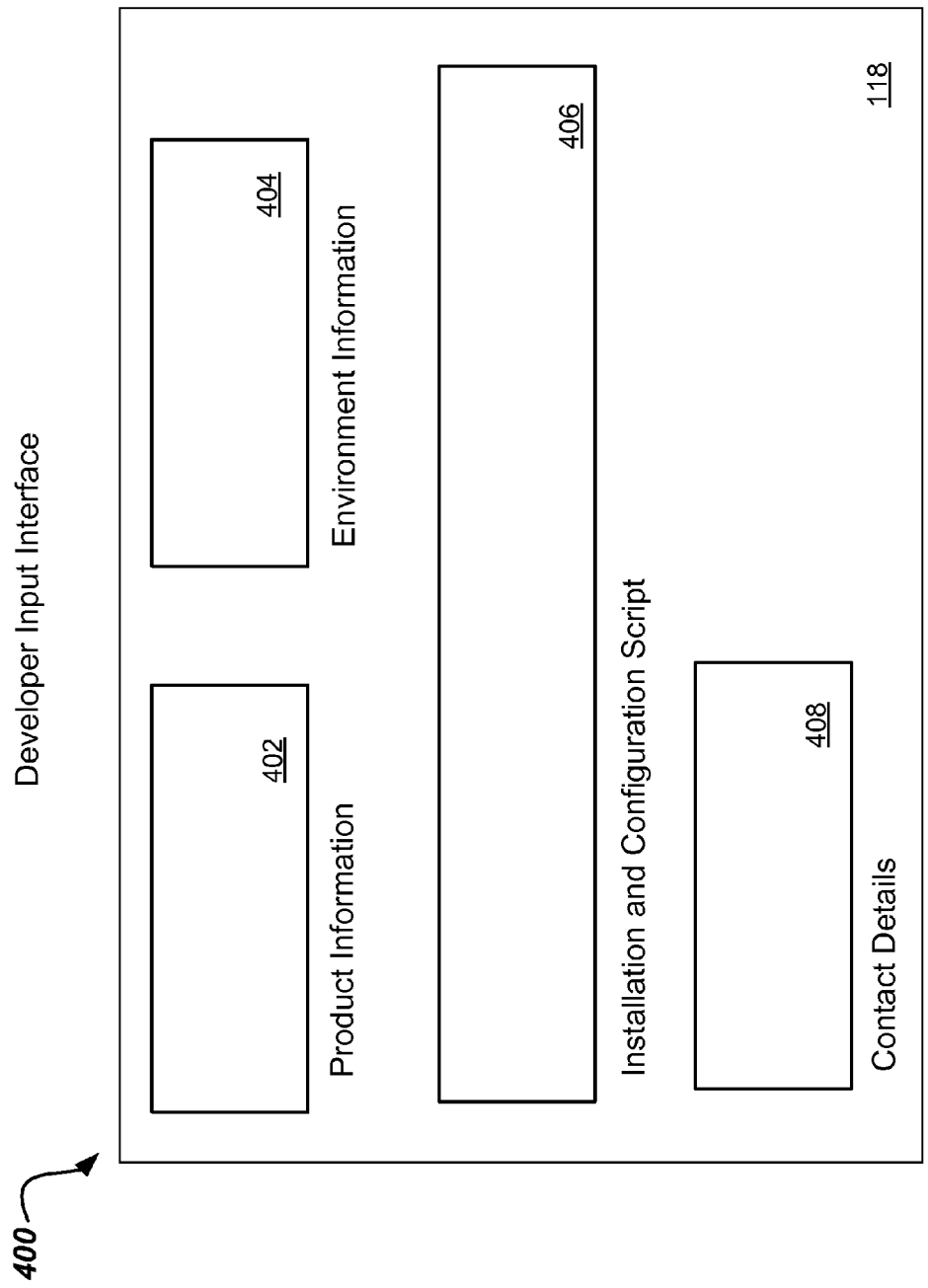
FIG. 4 illustrates an exemplary developer input interface according to one embodiment.

FIG. 4, an exemplary developer input interface 400 in accordance with one embodiment is depicted. As previously described, the developer input interface 118 may allow the product developer to enter the product information 402, the environment information 404 and the initial installation/configuration script 406, as well as the developer's contact details 408 into the installation and configuration knowledgebase 126 (FIG. 2).

Figure 5:
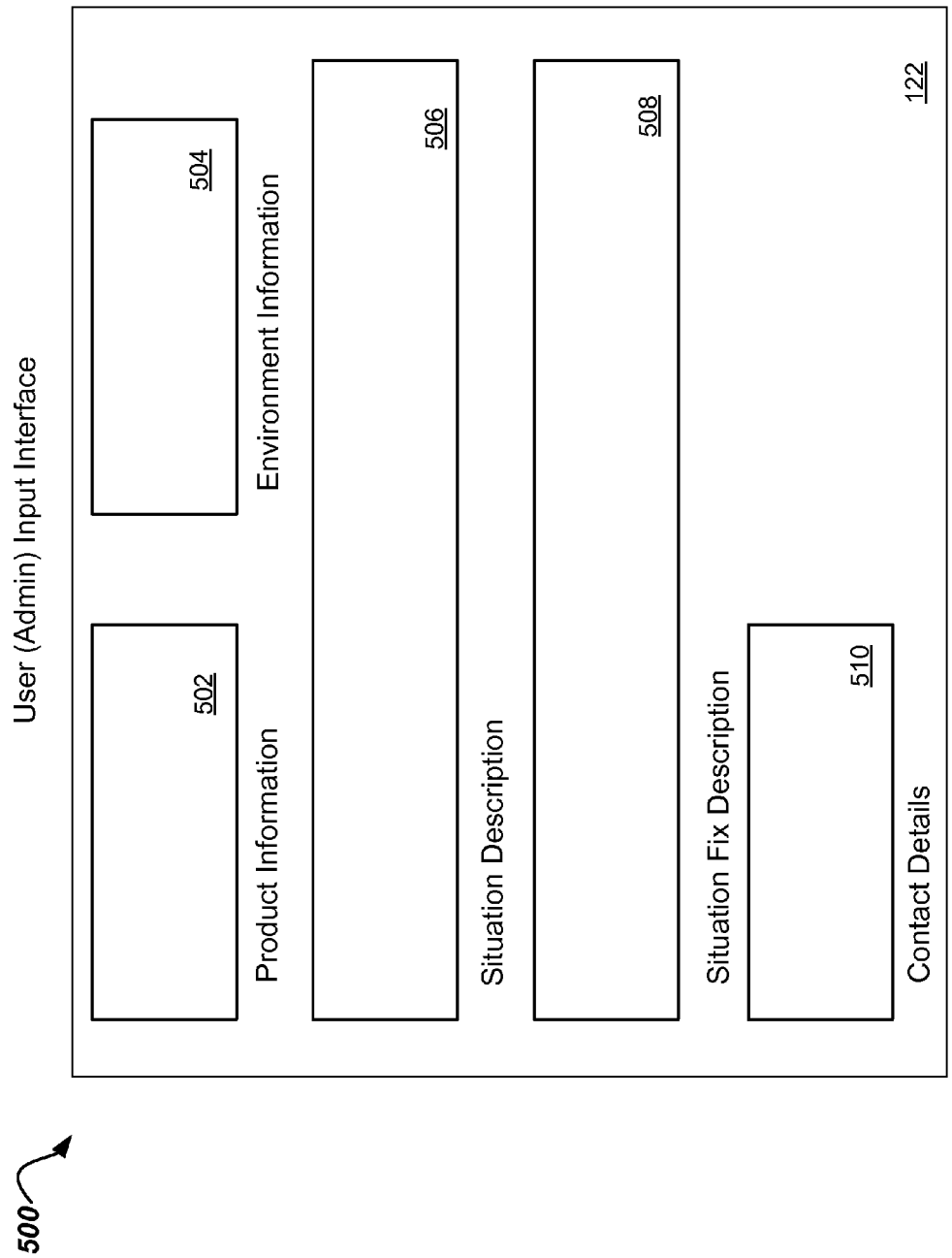
FIG. 5 illustrates an exemplary user (admin) input interface according to one embodiment.

FIG. 5, an exemplary user (administrator) input interface 500 in accordance with one embodiment is depicted. As previously described, the user input interface 122, may allow an administrator to enter into the installation and configuration knowledgebase 126 (FIG. 2), the product information 502, the environment information 504, the Situation Description 506 (e.g., new situation features/error messages), and the Situation Fix Description 508 (e.g., the associated knowledge as well as a new instance of the script) that the administrator may have modified (in case search for a similar situation in the installation and configuration knowledgebase 126 (FIG. 2) was not successful and administrator was able to fix the problem), and to enter the administrator's contact details 510 (emails and instant messaging).

Figure 6:
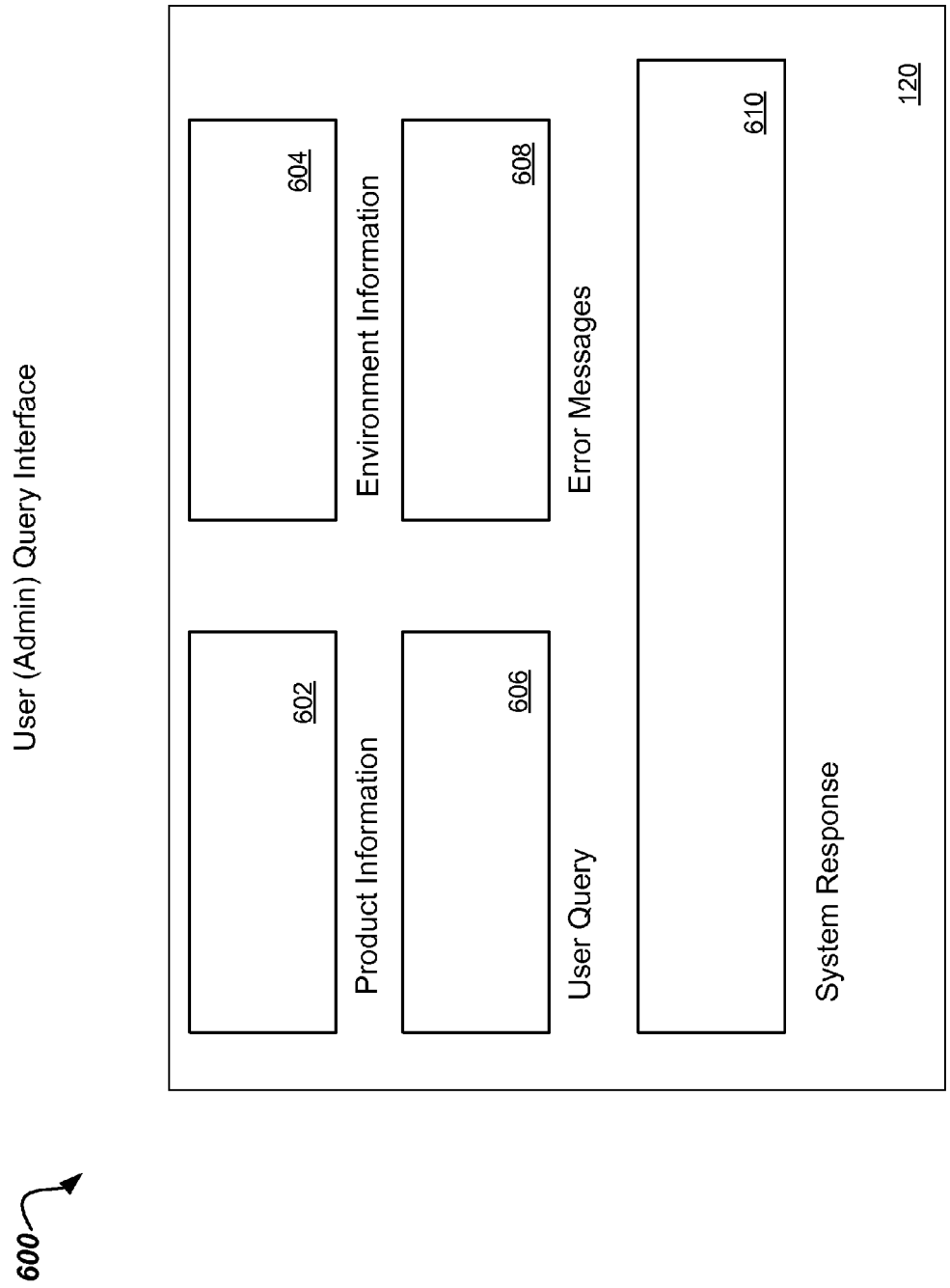
FIG. 6 illustrates an exemplary user (admin) query interface according to one embodiment.

FIG. 6, an exemplary user (administrator) query interface 600 according to one embodiment is depicted. The user query interface 120 may include product information 602, environment information 604, a user query 606, an error message 608, and a system response 610. As previously described, the user query interface 120 may allow the administrators to search for similar new installation/configuration situations through queries and identify installation/configuration script new instances for these situations, if it exists in the installation and configuration knowledgebase 126 (FIG. 2). As such, the administrators may receive knowledge and guidance from the system, about the closest similar situations to their problems (in case no direct match exists in the installation and configuration knowledgebase 126 (FIG. 2)), that could help them solve their problems, and to get in contact with the administrators that provided the new script instances for the closest similar situations, as well as the software product developer, through system initiated emails and instant messaging.

Figure 7:
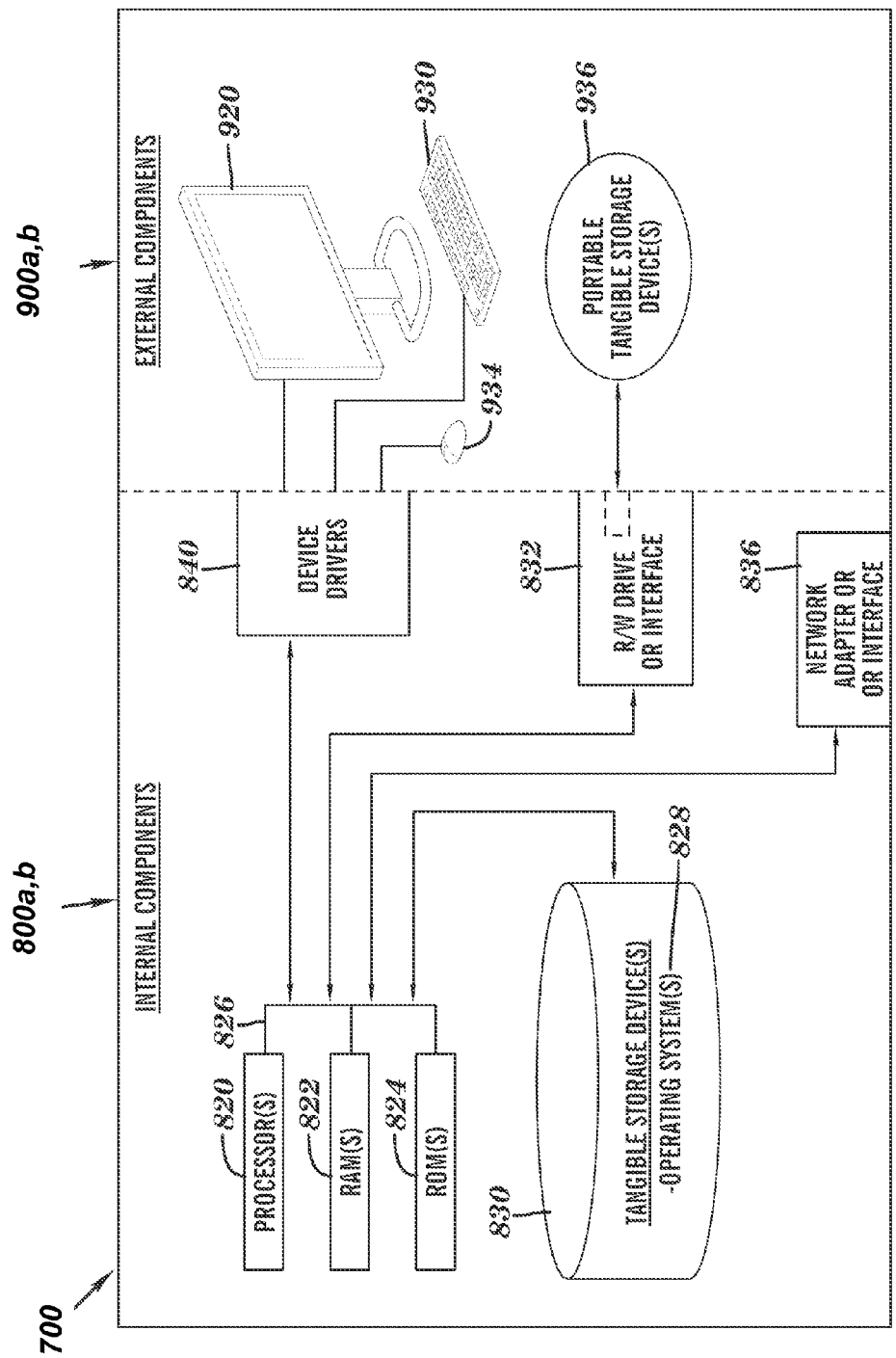
FIG. 7 is a block diagram of internal and external components of computers and servers depicted in FIG. 1 according to at least one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a, b illustrated in FIG. 7. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in client computer 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 7, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as software installation and configuration system 114 (FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) in client computer 102 (FIG. 1) and software installation and configuration system 114 (FIG. 1) can be downloaded to client computer 102 (FIG. 1) and server computer 112 (FIG. 1), respectively from an external computer via a network (for example, the Internet, a local area network or other, wide area network) and respective network adapters or interfaces 836. From the network adapters or interfaces 836, the code software program 108 (FIG. 1) in client computer 102 (FIG. 1) and in server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system to manage an initial software installation and configuration script, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    saving, by a plurality of collaboration tools, a new customization associated with the initial software installation and configuration script in an installation and configuration knowledgebase;
    saving, by the plurality of collaboration tools, a new solution associated with the initial software installation and configuration script in the installation and configuration knowledgebase;
    associating, through metadata, the saved new customization or the saved new solution with a plurality of environment parameters and a plurality of errors encountered along with a description of why and how the saved new customization or the saved new solution was developed, wherein the description of why and how the saved new customization or the saved new solution was developed is entered via a user input interface and includes a plurality of new situation features, a plurality of error messages, a plurality of associated knowledge, and a new instance of a script;
    querying, by a search engine or a similarity engine, the installation and configuration knowledgebase for the new customization or the new solution based on a comparison between a criteria provided by an administrator and an index of vocabularies related to the initial installation and configuration script, wherein the index of vocabularies correlate to a plurality of situation descriptions stored in the configuration knowledgebase; and
    returning, by the search engine or the similarity engine, a search result based on the querying the installation and configuration knowledgebase, wherein the search result identifies a customization or a solution that exactly matches or is a nearest similar match between the criteria provided by the administrator and the index of vocabularies.

2. The computer system of claim 1, further comprising:
    creating the initial installation and configuration script by a developer; and
    adding the initial installation and configuration script to the installation and configuration knowledgebase;
    adding a contact information associated with the administrator to the installation and configuration knowledgebase; and
    providing a means of communication among a plurality of administrators and the developer.

3. The computer system of claim 1, wherein the new solution comprises entering an error fixing associated with an encountered error via an administrator input interface.

4. The computer system of claim 1, wherein the new customization comprises entering a specific environment information and a specific situation via an administrator input interface.

5. The computer system of claim 1, wherein the querying the installation and configuration knowledgebase comprises a search engine.

6. The computer system of claim 1, wherein the querying the installation and configuration knowledgebase comprises a similarity engine.

7. The computer system of claim 2, wherein the creating the initial software installation and configuration script comprises entering a generic environment information via a developer input interface.

8. The computer system of claim 1, wherein the returning the search result comprises the similarity engine returning a closest similar situation to the provided criteria by matching an index derived from an administrator query against an index used to label a stored situations' description and a related administrator communication or a related developer communication log located in the installation and configuration knowledgebase using a same indexing vocabulary and by applying a similarity algorithm.

9. The computer system of claim 2, wherein the providing the means of communication comprises at least one of a collaboration tool to log a communication among a new administrator, a previous administrator, and the developer in the installation and configuration knowledgebase; to provide the installation and configuration knowledgebase with a communication log correlated to the product environment and product information; and to provide the installation and configuration knowledgebase with a related configuration script, wherein the communication log may be indexed by features and/or error messages to facilitate and expedite a search by a search engine for a previous problematic situation that was solved by a new instance of the software installation and configuration script and wherein the indexing may be constructed using vocabularies related to the software installation and configuration script based on a feature of the previous problematic situation that encodes a circumstance under which the previous problematic situation is appropriate to be used.

10. A computer program product to manage an initial software installation and configuration script, the computer program product comprising:
   one or more computer-readable tangible storage medium and program instructions stored on at least one of the one or more tangible storage medium, the program instructions executable by a processor, the program instructions comprising:
   program instructions to save, by a plurality of collaboration tools, a new customization associated with the initial software installation and configuration script in an installation and configuration knowledgebase;
   program instructions to save, by the plurality of collaboration tools, a new solution associated with the initial software installation and configuration script in the installation and configuration knowledgebase;
   program instructions to associate, through metadata, the saved new customization or the saved new solution with a plurality of environment parameters and a plurality of errors encountered along with a description of why and how the saved new customization or the saved new solution was developed, wherein the description of why and how the saved new customization or the saved new solution was developed is entered via a user input interface and includes a plurality of new situation features, a plurality of error messages, a plurality of associated knowledge, and a new instance of a script;
   program instructions to query, by a search engine or a similarity engine, the installation and configuration knowledgebase for the new customization or the new solution based on a comparison between a criteria provided by an administrator and an index of vocabularies related to the initial installation and configuration script, wherein the index of vocabularies correlate to a plurality of situation descriptions stored in the configuration knowledgebase; and
   program instructions to return, by the search engine or the similarity engine, a search result based on the querying the installation and configuration knowledgebase, wherein the search result identifies a customization or a solution that exactly matches or is a nearest similar match between the criteria provided by the administrator and the index of vocabularies.

11. The computer program product of claim 10, further comprising:
   program instructions to create the initial installation and configuration script by a developer; and
   program instructions to add the initial installation and configuration script to the installation and configuration knowledgebase;
   program instructions to add a contact information associated with the administrator to the installation and configuration knowledgebase; and
   program instructions to provide a means of communication among a plurality of administrators and the developer.

* * * * *